W. F. LUTZ, JR.
KNIFE.
APPLICATION FILED SEPT. 12, 1910.
997,683.
Patented July 11, 1911.
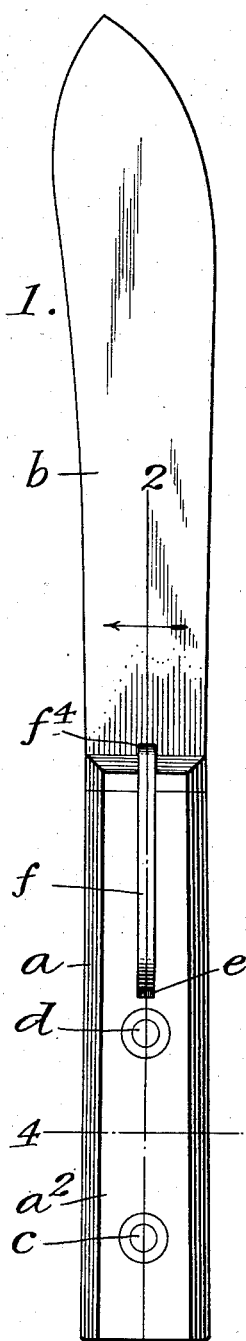
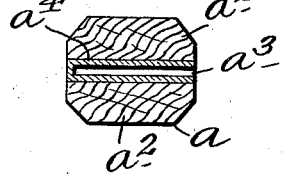
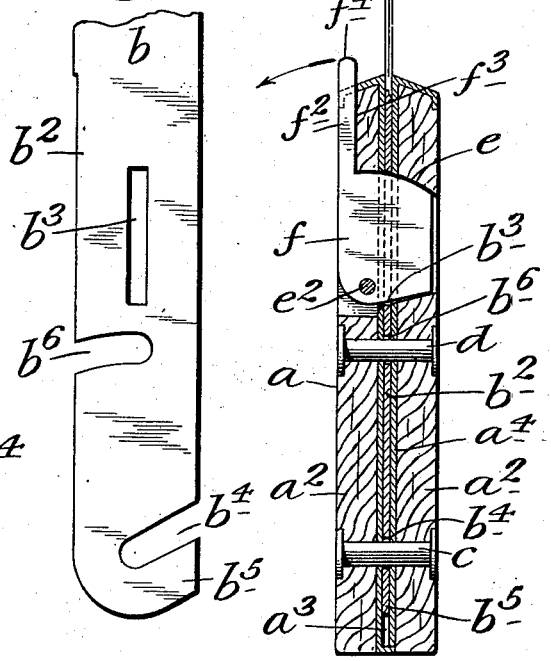
WITNESSES
A. R. Appleman
B. M. Ryerson
INVENTOR
William F. Lutz, Jr.,
BY Edgar Tate
ATTORNEYS

UNITED STATES PATENT OFFICE.

WILLIAM F. LUTZ, JR., OF BROOKLYN, NEW YORK.

KNIFE.

997,683.   Specification of Letters Patent.   Patented July 11, 1911.

Application filed September 12, 1910. Serial No. 581,665.

*To all whom it may concern:*

Be it known that I, WILLIAM F. LUTZ, Jr., a citizen of the United States, and residing at Brooklyn, in the county of Kings and State of New York, have invented certain new and useful Improvements in Knives, of which the following is a specification, such as will enable those skilled in the art to which it appertains to make and use the same.

This invention relates to knives, and particularly to butchers' knives, carving knives, kitchen knives, table knives, and other knives of this class, and the invention relates more particularly to the construction of the shank of the blade, and to the construction of the handle, whereby the blade may be removed from the handle and another blade placed in it whenever desired; a further object being to provide means whereby the blades of knives of the class specified, or other knives as may be desired, may be quickly and easily detached from the handle and reconnected therewith; and with this and other objects in view the invention consists in the construction hereinafter described and claimed.

The invention is fully described in the following specification of which the accompanying drawings form a part, and in which the separate parts of the construction are designated by suitable reference characters, and in which:—

Figure 1 is a side view of a knife of the class specified, involving my invention. Fig. 2 a longitudinal section on the line 2—2 in Fig. 1. Fig. 3 a side view of the shank portion of the blade detached from the handle, and Fig. 4 a cross section on the line 4—4 of Fig. 1.

In the practice of my invention I provide a handle $a$ and blade $b$, and the blade $b$ is provided with a shank portion $b^2$ which is approximately of the same width as the handle. The body portion of the shank $b^2$ of the blade is provided adjacent to the blade with a central longitudinal slot $b^3$, and the end of the shank portion $b^2$ opposite the blade is provided in one side edge thereof with an inclined recess $b^4$ which extends transversely thereof and to the transverse center thereof, and which forms a hook member $b^5$, and the opposite edge of the shank portion $b^2$ of the blade is provided centrally with a transverse recess $b^6$.

The handle $a$, in the form of construction shown, consists of two side members $a^2$, between which is a central longitudinal space or chamber $a^3$ which is closed at one end and one side thereof, and this space or chamber $a^3$ in the form of construction shown is formed by a metallic casing $a^4$ which is placed between the side portions $a^2$ of the handle as clearly shown in Figs. 2 and 4.

Passed through the handle $a$ and corresponding in position with the position of the recess $b^4$ and $b^6$ in the opposite side edges of the shank $b^2$ of the blade are rivets $c$ and $d$, the rivet $c$ corresponding with the recess $b^4$ in the shank of the blade, and the rivet $d$ with the recess $b^6$ in the shank of the blade. The handle $a$ is also provided in the end portion thereof opposite the rivet $c$ with a transverse oblong slot $e$ which extends entirely therethrough, and which is arranged at right angles to the blade $b$, and which ranges longitudinally at said shank, and in which is pivoted as shown at $e^2$ a flat oblong catch piece or dog $f$ having a handle portion $f^2$ which normally fits in the longitudinal recess $f^3$ in one side of the handle $a$ as clearly shown in Figs. 1 and 2, and the handle portion $f^2$ is provided with a projecting finger piece $f^4$ which extends parallel with the blade $b$ and projects beyond the blade end of the handle $a$.

In order to connect the blade with the handle, the catch piece or dog $f$ is turned out in the direction indicated by the arrow $x$ in Fig. 2. The end of the shank $b^2$ of the blade $b$ is then inserted into the chamber $a^3$ and manipulated so that the rivet $c$ will pass into the recess $b^4$, after which the blade is turned down or swung down in the handle as shown in Figs. 1 and 2, after which the catch piece or dog $f$ is swung down into the locking position as shown in Fig. 2. In this operation of connecting the blade with the handle, and when the shank of the blade has been connected with the rivet $c$, and the blade swung down into the handle, the rivet $d$ enters the recess $b^6$ in the shank of the blade, and when the catch piece or dog $f$ is swung into locking position, the blade is securely locked in the handle and cannot be removed without first swinging the catch piece or dog $f$ out of the slot or recess $e$ in the direction of the arrow $x$. The catch piece or dog $f$ is so formed as to fit snugly in the locking position as shown in Fig. 2 by friction, and the outer edge thereof when said catch piece or dog is in operating position is flush with the side of the handle.

It will be understood that the knife blade as shown and described is or may be provided as an article of manufacture independently of the handle, and the handle is or may also be provided independently of the blade in the same manner, or the blade and handle may be made and connected as shown and described and the complete device or knife may be placed on the market as a whole.

My invention is not limited to the material of which the handle is composed, nor to the exact details of the construction thereof as hereinafter shown and described, and various changes therein and modifications thereof may be made, within the scope of the appended claims, without departing from the spirit of my invention or sacrificing its advantages.

Having fully described my invention, what I claim as new and desire to secure by Letters Patent of the United States is:—

1. A knife blade provided with a shank, one side edge of which is provided adjacent to the end thereof, with a transverse recess forming a hook member, the opposite side edge being provided centrally with a transverse recess, and the body thereof being provided adjacent to the blade with a longitudinal slot.

2. A knife of the class described, said knife comprising a blade provided with a shank, one side edge of which is provided adjacent to the end thereof with a transverse recess forming a hook member, the opposite side edge being provided centrally with a transverse recess and the body thereof being provided adjacent to the blade with a longitudinal slot; and a handle provided centrally and longitudinally with a chamber which is U-shaped in cross section and open at one side and one end, said handle being also provided at the opposite end with a transverse pin which is adapted to be engaged by the hook member of the shank of the blade and centrally with another transverse pin which is adapted to enter the central recess formed in the shank of the blade and said handle being also provided with a pivoted lock device adapted to enter the longitudinal slot in the shank of the blade.

In testimony that I claim the foregoing as my invention I have signed my name in presence of the subscribing witnesses this 22nd day of August, 1910.

WILLIAM F. LUTZ, Jr.

Witnesses:
B. M. RYERSON,
C. E. MULREANY.

---

Copies of this patent may be obtained for five cents each, by addressing the "Commissioner of Patents, Washington, D. C."